(12) United States Patent
Desai et al.

(10) Patent No.: US 6,848,062 B1
(45) Date of Patent: Jan. 25, 2005

(54) MESH PROTECTION SERVICE IN A COMMUNICATIONS NETWORK

(75) Inventors: Premal Desai, San Jose, CA (US); Biao Lu, Cupertino, CA (US); Theodore Tedijanto, Cupertino, CA (US); Michael Champlin, San Jose, CA (US)

(73) Assignee: CIENA Corporation, Linthicum, MD (US)

( * ) Notice: Subject to any disclaimer, the term of this patent is extended or adjusted under 35 U.S.C. 154(b) by 581 days.

(21) Appl. No.: 10/037,156

(22) Filed: Dec. 21, 2001

(51) Int. Cl.[7] .............................................. G06F 11/00
(52) U.S. Cl. ................................... 714/4; 370/216
(58) Field of Search ........................... 714/4, 3, 18, 37, 714/43, 47, 56; 370/216, 217; 709/223, 224

(56) References Cited

U.S. PATENT DOCUMENTS

| | | | |
|---|---|---|---|
| 116,669 A | 4/1871 | Jain ............................. | 714/43 |
| 5,572,679 A | 11/1996 | Ishizaka et al. ........ | 395/200.12 |
| 5,742,753 A | 4/1998 | Nordsieck et al. ..... | 395/182.09 |
| 5,768,501 A | 6/1998 | Lewis ................... | 395/185.01 |
| 5,805,578 A * | 9/1998 | Stirpe et al. ................. | 370/254 |
| 6,145,102 A | 11/2000 | Klein et al. .................... | 714/47 |
| 6,243,838 B1 | 6/2001 | Liu et al. ...................... | 714/57 |
| 6,259,679 B1 * | 7/2001 | Henderson et al. ......... | 370/254 |
| 6,269,330 B1 | 7/2001 | Cidon et al. .................. | 704/43 |
| 6,307,834 B1 | 10/2001 | Worster ...................... | 370/218 |
| 6,324,162 B1 * | 11/2001 | Chaudhuri ................... | 370/225 |
| 6,370,110 B1 * | 4/2002 | Eslambolchi ............... | 370/216 |
| 6,446,222 B1 | 9/2002 | Phaal .......................... | 714/43 |
| 6,505,310 B1 | 1/2003 | Brown et al. ................ | 714/43 |
| 6,505,311 B1 | 1/2003 | Ichinohe et al. ............. | 714/56 |
| 6,519,224 B2 * | 2/2003 | Hrastar et al. .............. | 370/227 |
| 6,748,434 B2 * | 6/2004 | Kavanagh ................... | 709/224 |
| 6,778,491 B1 * | 8/2004 | Fourcand et al. ........... | 370/217 |
| 2003/0055954 A1 * | 3/2003 | Kavanagh ................... | 709/224 |
| 2003/0063613 A1 * | 4/2003 | Carpini et al. .............. | 370/401 |

OTHER PUBLICATIONS

"PCT, International Search Report".

* cited by examiner

*Primary Examiner*—Nadeem Iqbal
(74) *Attorney, Agent, or Firm*—Michael R. Cammarata; David A. Fox

(57) ABSTRACT

An embodiment of the invention is a network element including a monitor module for monitoring received network traffic on a uni-directional, first working link and detecting a failure in the first working link. A controller in communication with the monitor module is notified of a failure in the first working link. A mesh protection service (MPS) module is in communication with the controller. The MPS module transmits an MPS message signal using uni-directional communications. The MPS message signal identifies the first working link.

20 Claims, 6 Drawing Sheets

MESH PROTECTION SERVICE IN A COMMUNICATIONS NETWORK

BACKGROUND OF THE INVENTION

1. Field of invention

The invention relates generally to communication networks and in particular to a method and system for providing mesh protection services in a communications network.

2. Description of Related Art

In conventional communications networks, protection techniques are used to provide bandwidth for one or more working paths in the event the working path fails. A variety of protection topologies exist and include assigning a single protection path for each working path (referred to as 1:1 protection) or multiple working paths sharing a protection path (referred to as 1:N protection). Protection topologies also vary depending on the network topology and may be implemented in linear, ring or mesh configurations. Protection mechanisms may be implemented at the link level such as automatic protection switching (APS) or at higher levels such as ring level bidirectional line switched ring (BLSR).

FIG. 1 depicts a portion of an exemplary conventional communications network. The network includes network elements 10, 12, 14 and 16 coupled together by a number of working links W1–W12. Each working link can be implemented through the use of a unidirectional link carrying signals in one of two directions, often referred to as "east" or "west". For illustrative purposes only, network element 10 will be considered the source (e.g., originating node) for network traffic directed to network element 16 (e.g., terminating node) through network elements 12 and 14.

In the event of a failure in a working line, due to the nature of uni-directional links, the system of FIG. 1 has difficulties in restoring network traffic. The failure may be a hard failure (e.g., loss of signal) or a soft failure (e.g., degradation of signal). For example, if working link W5 experiences a failure 13 (e.g., a hard failure), network element 14, which in this example was receiving a signal from network element 12, will stop receiving the signal from network element 12. This loss of signal with network element 12 enables network element 14 to detect the failure on the link with network element 12. Upon identifying a failure on working link W5, network element 14 will generate a release message signal 15, which is transmitted to network element 16 to inform network element 16 of the failure. Network element 14, however, does not generate its own release message signal to network element 12. The reason for this limitation is that the release message signal is a path-level message that relies upon bi-directional communication for providing reliable delivery. Because working link W5 has failed, bidirectional communication between network elements 12 and 14 is not available. Thus, no signaling release message signal is generated from network element 14 to network element 12.

Since network element 12 does not receive a release message signal from network element 14 and the unidirectional working link W6 with network element 14 still provides network element 12 with a signal, network element 12 is not aware of the link failure on working link W5. Therefore, network element 12 will either receive the release message signal from network element 10 after it traverses across the network, or alternatively for other reasons may never receive the notification of the link failure.

SUMMARY OF THE INVENTION

An embodiment of the invention provides a mesh protection service for better communicating failures on links on a network. In particular, a first network element can include a monitor module for monitoring received network traffic on a uni-directional working link and detecting a failure on that working link. A controller in communication with the monitor module is notified of a failure in the first working link. A mesh protection service (MPS) module is in communication with the controller and transmits an MPS message signal to a second network element to notify the second network element of a failure on one of the links between the first network element and the second network element.

Further scope of applicability of the present invention will become apparent from the detailed description of embodiments of the present invention given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description of embodiments given hereinbelow and the accompanying drawings which are given by way of illustration only, and thus do not limit the scope of the present invention, and wherein.

DETAILED DESCRIPTION OF THE INVENTION

The following detailed description of embodiments of the invention refers to the accompanying drawings. The same reference numbers in different drawings identify the same or similar elements. Also, the following detailed description of embodiments of the invention does not limit the scope of the invention. Instead, the scope of the invention is defined by the appended claims and equivalents thereof.

Figure 1:
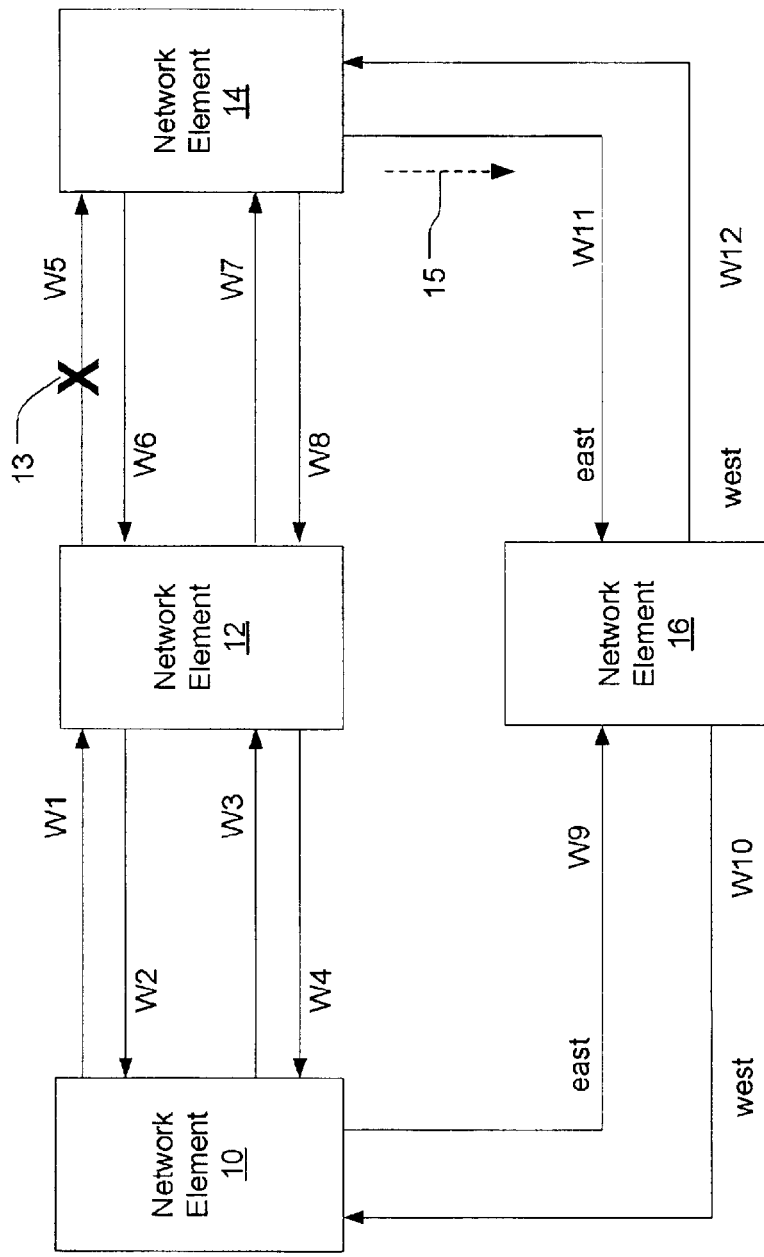
FIG. 1 is a block diagram of a portion of a conventional communications network.
Figure 2:
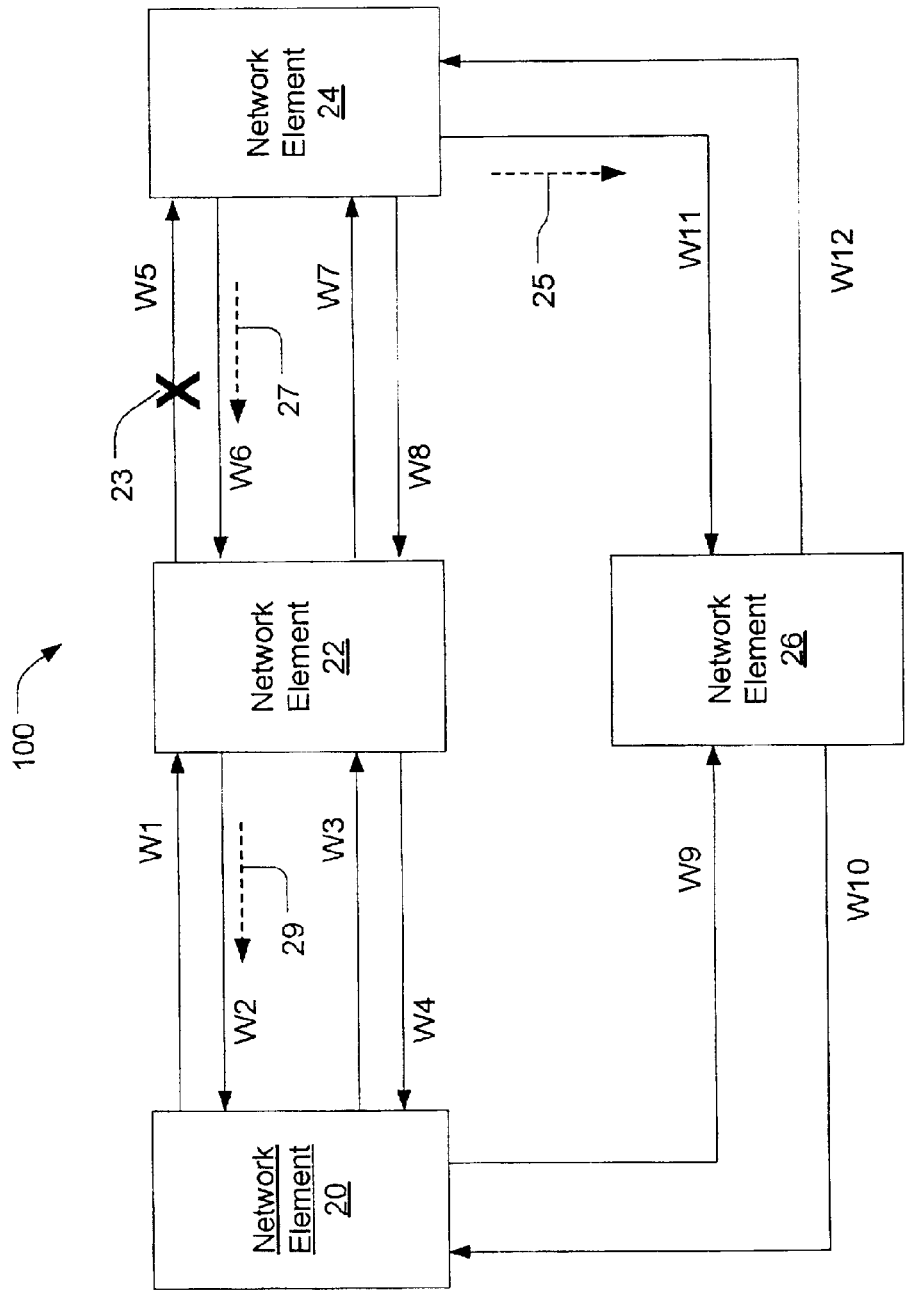
FIG. 2 is a block diagram of a portion of a communications network utilizing a mesh protection service of an embodiment of the invention.

FIG. 2 is a block diagram of a portion of a communications network 100 implementing a mesh protection service of an embodiment of the invention. FIG. 2 depicts network elements 20, 22, 24 and 26 coupled by a number of working links W1–W12. In one embodiment of the invention, the working links are lengths of optical fiber, the network elements 20, 22, 24 and 26 are switches and a routing and signaling protocol is the optical routing and signaling protocol (OSRP), which is described in greater detail in co-pending U.S. patent application, Routing and Signaling in a SONET Network, filed Mar. 1, 1999, Ser. No. 09/259,263, the entire contents of which are incorporated herein by reference. For illustrative purposes only, the network 100, which will be discussed in several embodiment of the invention, will be a SONET-based network. However, in alternative embodiments, the network can be any type of network. In addition, in alternative embodiments, the working links can be any type of conduit, including wireless transmission links or electrical wireline connections, the network elements can be any type of network element, including a router, a transport device, an optical amplifier, an add/drop multiplexer, a transmitter, a receiver, a transceiver, an end terminal, etc, and the routing and signaling protocol can by any type of signaling/routing protocol for connection oriented networks including PNNI, OSPF, RSVP or MPLS.

The working links typically are unidirectional and carry network traffic in one direction. Each network element includes a processor (e.g., a commercially available microprocessor) for implementing services. One such service is mesh protection services, which provides for signaling between network elements for rerouting network traffic after a failure is detected upon a working link that is coupled to the network element executing the mesh protection service. The mesh protection service will be described in greater detail herein. The processor may implement the mesh protection service in response to a computer program in a storage medium accessible by the processor.

Figure 3:
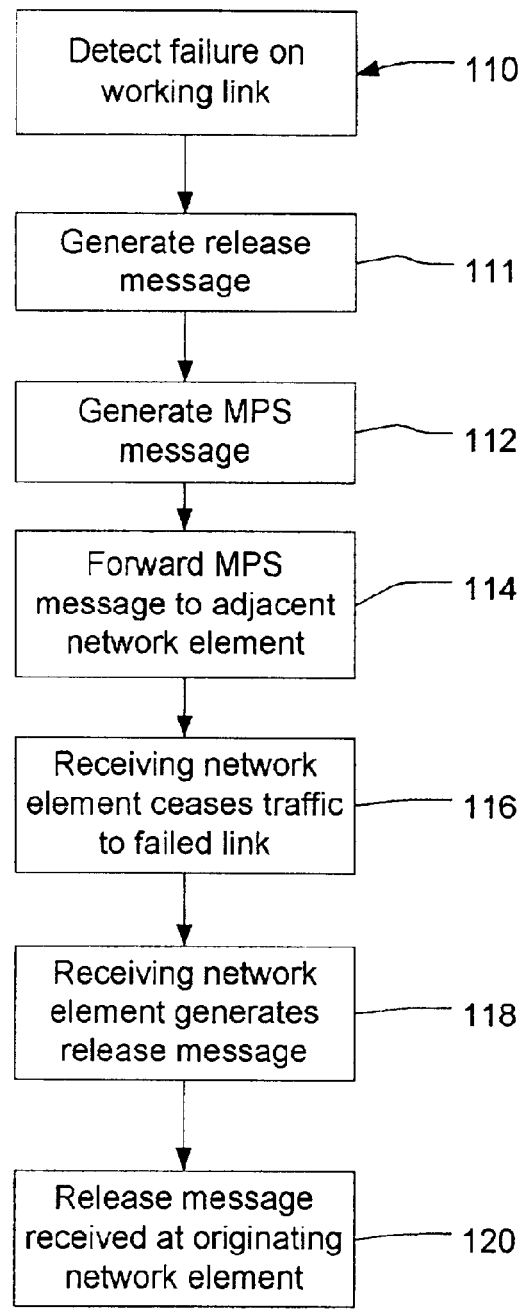
FIG. 3 is a flowchart of an exemplary mesh protection service process of an embodiment of the invention.

FIG. 3 is a flowchart of an embodiment of a mesh protection service process for redirecting network traffic in the event of a working link failure. For purposes of illustration, the mesh protection service process is discussed in the context of a failure 23 in working link W5 of FIG. 2. The process begins at step 10 when a network element detects a failure in a working link. The failure may be characterized as a hard failure (e.g., loss of signal) or a soft failure (e.g., a degradation of signal) and may be detected using known conventional techniques. At step 111 upon detection of a failure, a conventional release message signal 25 is generated and transmitted to a network element, which is not directly coupled to the failed working link. As noted above, the release message signal is a path-level message using bi-directional communications. In the example shown in FIG. 2, network element 24 detects failure 23 of working link W5 and a release message signal 25 is generated by network element 24 and transmitted to network element 26 over working link W11.

At step 112, the network element detecting the failure generates a mesh protection service (MPS) message signal. The MPS message signal identifies the failed working link and requests that traffic be redirected to avoid this working link. At step 114, the MPS message signal is forwarded on a working link to an adjacent network element in a direction opposite the direction of the link on which the failure was detected. In the example shown in FIG. 2, network element 24 generates an MPS message signal 27 on working link W6 to network element 22. The MPS message signal may be generated in a variety of forms. In one embodiment, the MPS message signal is a line-level message provided in overhead bytes. For example, in a Synchronous Optical Network (SONET)-based communication network 100, the overhead bytes can specifically be K1/K2 bytes of the SONET protocol header. In this embodiment, using these overhead bytes is desirable because this portion of the header is not being used on the working links. In an alternative embodiment of the invention, the network can rely upon a stand-alone signal a protocol, which is not contained within any overhead bytes, to transmit the MPS message signal 27. In yet another embodiment, the network 100 can rely upon an out-of-band link between network elements, such as an overlay Internet Protocol (IP) network or a wavelength utilized for communications between network elements (e.g., a service channel), to transmit the MPS message signal 27.

At step 116, the MPS message signal is received at a receiving network element and the receiving network element ceases directing network traffic to the failed working link, which is identified by the MPS message signal. In the example shown in FIG. 2, upon receiving and processing the MPS message signal 27 received from network element 24, network element 22 would cease directing network traffic to working link W5, which was identified by the MPS message signal 27 as having failed.

At step 118, the receiving network element generates a release message signal and directs the release message signal on a working link to an adjacent network element in a direction opposite the direction of the link on which the failure was detected. In the example shown in FIG. 2, network element 22 would generate a release message signal 29 on working link W2 to network element 20. The release message signal 29 may be a path-level message similar to conventional release message signals using bi-directional communications to ensure reliable delivery.

In step 120, the originating network element receives the release message signal and reroutes network traffic to the destination network element. In the example shown in FIG. 2, network element 20 is the originating network element, which reroutes traffic to the destination network element 26 over working links W9 and W10. The switching described above may be revertive. In other words, once the failed working link (e.g., working link W5) has been restored, network traffic may be redirected back to the original network configuration (e.g., working links W5 and W6).

The above-described embodiment describes the mesh protection service as a stand-alone protection mechanism. In an alternate embodiment of the invention, the mesh protection service may be used as a compliment to another protection scheme. In such a configuration, in the event the first protection scheme cannot redirect network traffic due to a failed link, the mesh protection service can be used to redirect network traffic to circumvent the failed link. This embodiment is described herein with reference to FIGS. 4–5.

Figure 4:
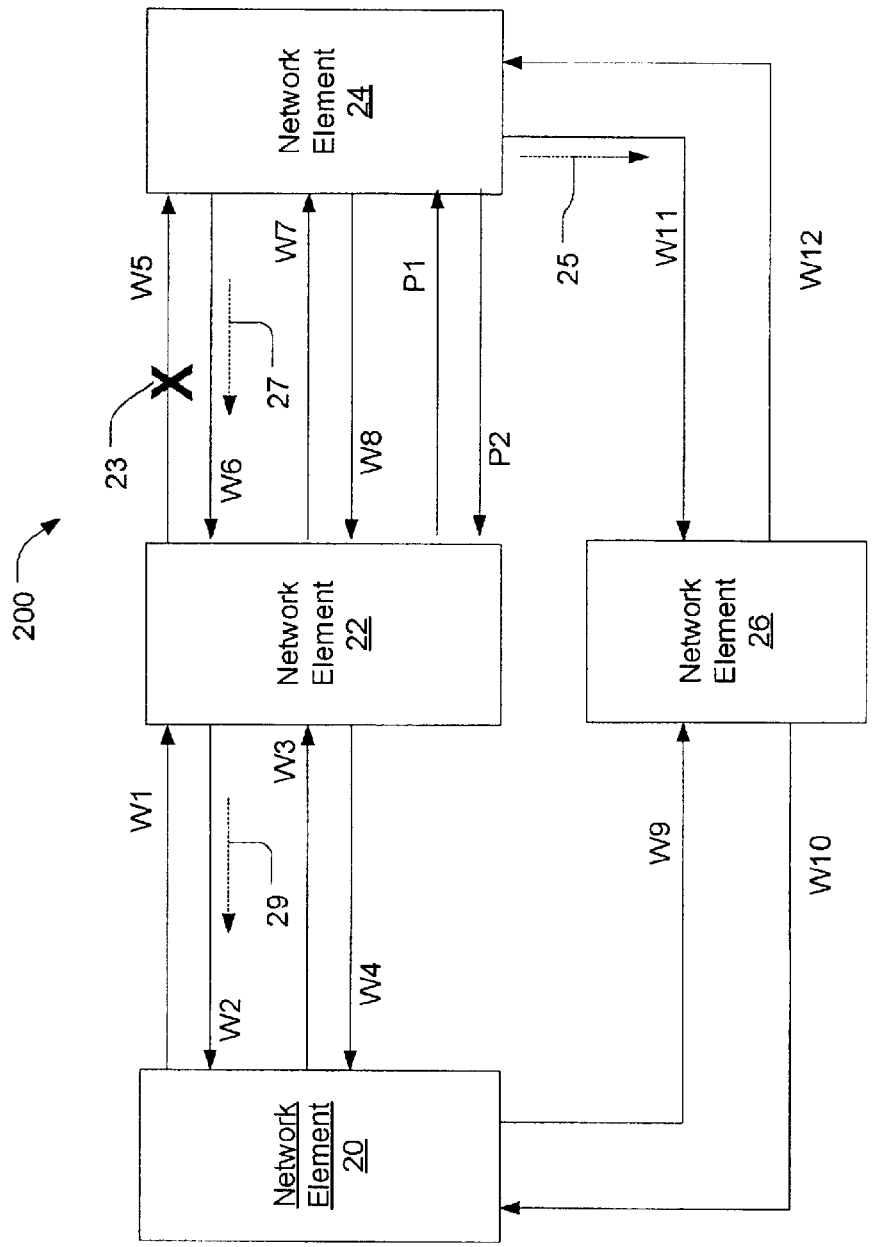
FIG. 4 is a block diagram of a portion of a communications network implementing a mesh protection service in an alternate embodiment of the invention.

FIG. 4 is a block diagram of a portion of a communications network 200, which includes both the mesh protection service and another protection switching service. As shown in FIG. 4, the communications network 200 includes working links W1–W12 as described above and protection links P1–P2. Protection links P1–P2 provide for conventional protection switching such as 1:N automatic protection switching (APS) for working links W5–W8. As described in further detail with respect to FIG. 6, each network element can rely upon a first protection switching service that utilizes the protection links P1–P2 and the mesh protection service as a secondary protection switching service. As similarly described above, these protection switching services may be implemented by utilizing a processor in the network element, which executes a computer program. The first protection switching service may be a conventional technique such as APS, BLSR, or mesh protection, as described in more detail in the above mentioned co-pending U.S. patent application, Routing and Signaling in a SONET Network, filed Mar. 1, 1999, Ser. No. 09/259,263, the entire contents of which are incorporated in its entirety herein by reference, virtual line switched ring (VLSR), as described in more detail in co-pending U.S. patent application, Virtual Line Switched Ring, filed on Oct. 19, 1999, Ser. No. 09/421,062, which is herein incorporated by reference in its entirety, etc.

Figure 5:
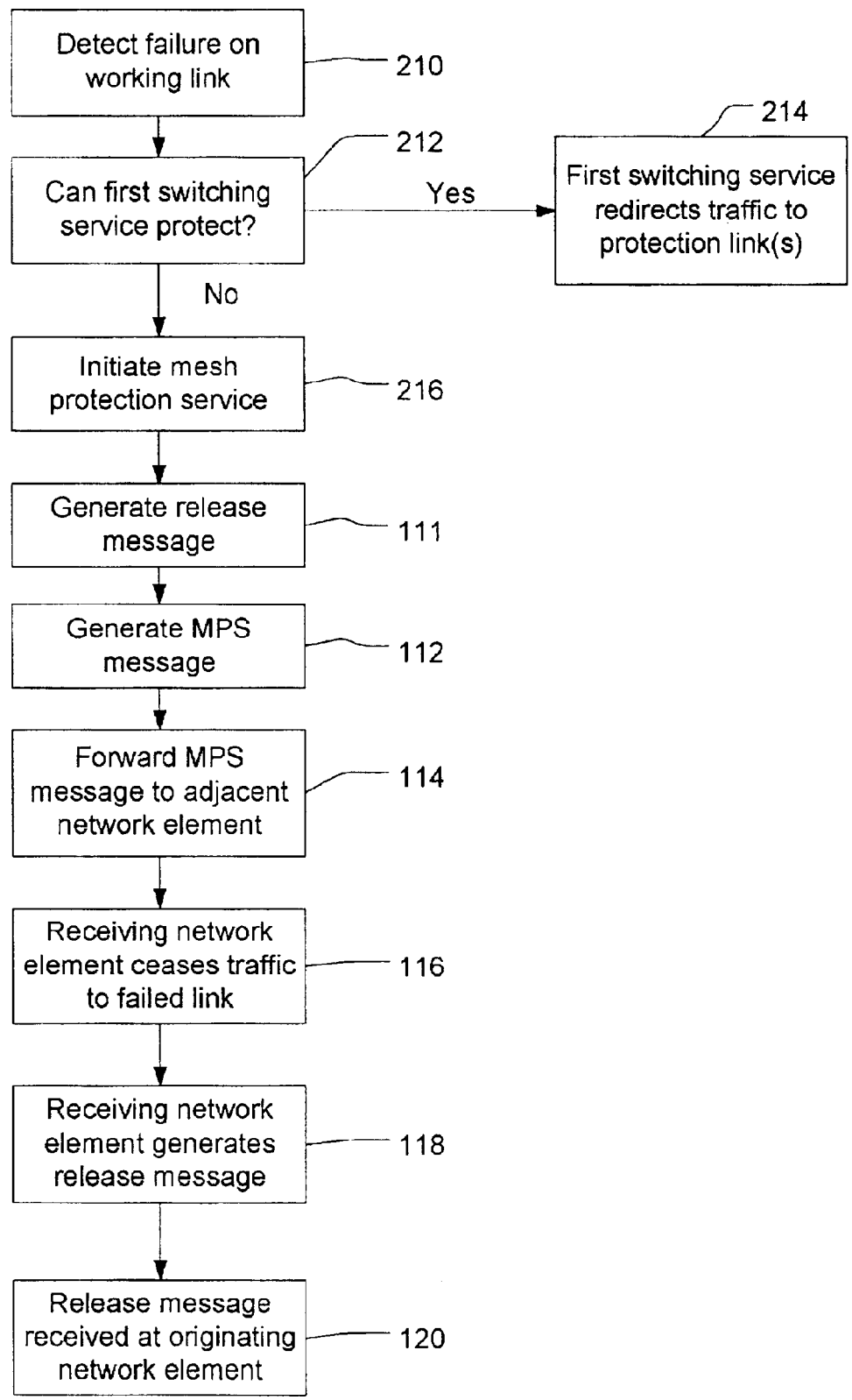
FIG. 5 is a flowchart of an exemplary mesh protection service process in an alternate embodiment of the invention; and, FIG. 6 is a block diagram of two exemplary network elements of an embodiment of the invention.

Operation of the embodiment of FIG. 4 will be described with reference to FIG. 5. FIG. 5 is a flowchart of the mesh protection service, which is used to compliment a first protection service. In step 210, a network element detects a failure in a working link. The failure may be characterized as a hard failure (e.g., loss of signal) or a soft failure (e.g., a degradation of signal). In the example shown in FIG. 4, network element 24 detects the failure 23 at working link W5.

In step 212, the network element determines whether the first protection service (e.g., APS) can protect the failed working link. The ability of the first protection service to provide protection may be based on the availability of protection links. If so, in step 214, the first protection service is executed. In the example show in FIG. 4, the first protection service may route traffic intended for working link W5 to protection link P1. In this example, the first protection service has protected the failed working link, thereby not triggering the need for any alternative protection service, such as the mesh protection service.

If another working link fails (e.g., working link W7) the process again begins at step 210 with network element 24 detecting a failure. In step 212, the network element 24 determines whether the first protection service can protect this newly failed working link. As protection link P1 is already carrying network traffic due to the failure of working link W5, the first protection service that relies on the protection links cannot provide protection for the newly failed working link. Thus, in step 216 the mesh protection service is initiated and a similar process to that described in FIG. 3 is executed.

Figure 6:
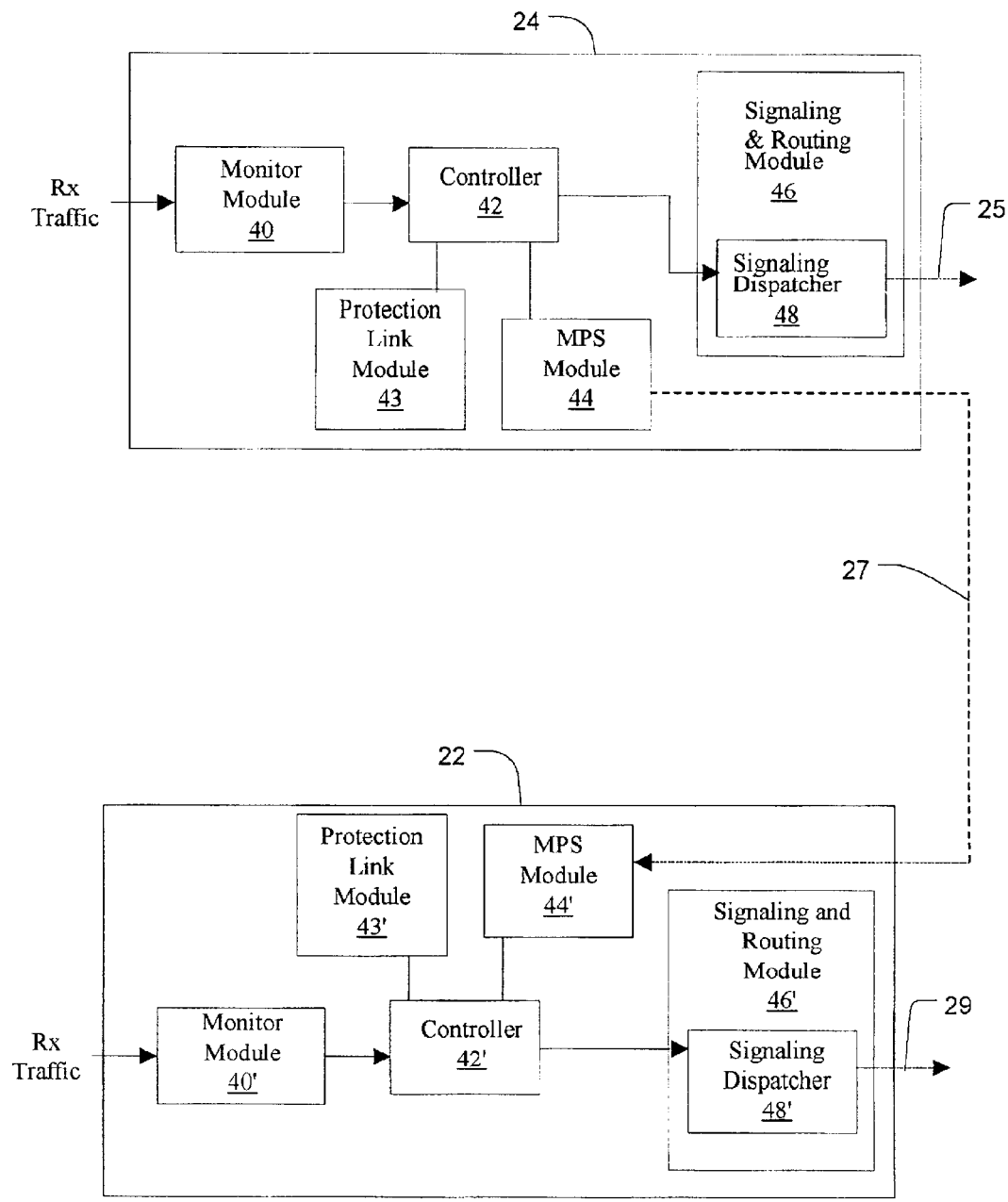

FIG. 6 is a block diagram of an embodiment of the present invention, where each network element includes a link failure monitor module 40, a controller 42, a signaling and routing module 46, an MPS module 44 and a protection link monitor 43. These modules may be implemented by a processor executing a computer program stored in a storage medium accessible by the processor. The monitor module 40 monitors the links of the network element (e.g., network element 24), which receives signals from other network elements (e.g., network element 22), and determines whether a failure of a link has occurred. If the monitor module 40 determines that such a failure has occurred, the monitor module 40, which is coupled to the controller 42, transmits a failure signal to the controller 42. The controller 42, which also is coupled to the protection link module 43, the MPS module 44 and the signaling and routing module 46, communicates with the protection link module 43 to determine whether a protection link can be used for protection for the failed link. If the controller 42 receives confirmation from the protection link module 43 that a protection link is available for the failed link, the controller 42 triggers the rerouting of the traffic from the failed working link to the available protection link as described above with reference to steps 212 and 214 of FIG. 5.

If the controller 42 receives confirmation from the protection link module 43 that a protection link cannot be used to protect the failed working link (e.g., due to a lack of available protection links), the controller 42 triggers the MPS module 44 to execute the mesh protection service, as described above, including the transmission of the MPS message signal to network element 22. In addition to the triggering of the MPS module, the controller 42 also communicates with the signaling and routing module 46 to trigger a signal dispatcher 48 to generate and transmit a release message signal to an adjacent network element (e.g., network element 26).

When the MPS module 44' of network element 22 receives the MPS message signal 27 from the MPS module 44 of network element 24, the MPS module 44' of network element 22 instructs the signal dispatcher 48' of the signaling and routing module 46' of network element 22 to generate a release message signal 29 to an adjacent network element (e.g., network element 20) using bi-directional communications. Upon receiving the release message signal from network element 22, network element 20, the originating network element of the transmission of this exemplary embodiment of the invention, reroutes the corresponding network traffic via network element 26 in order for the traffic to reach its designated destination.

The processing performed to implement the mesh protection service (either as a stand-alone service or a compliment to another protection service) may be implemented by processors on one or more network elements. Thus, the invention may be embodied in the form of a computer program code including instructions embodied in tangible media, such as floppy diskettes, CD-ROMs, hard drives, memory or any other computer-readable storage medium, wherein, when the computer program code is loaded into and executed by a processor, the processor becomes an apparatus for practicing an embodiment of the invention. Also included may be embodiments in the form of computer program code, for example, whether stored in a storage medium, loaded into and/or executed by a processor, or as a data signal transmitted, whether a modulated carrier wave or not, over some transmission medium, such as over electrical wiring or cabling, through fiber optics, or via electromagnetic radiation, wherein, when the computer program code is loaded into and executed by a processor, the processor becomes an apparatus for practicing the embodiment of the invention. When implemented on a general-purpose microprocessor, the computer program code segments configure the microprocessor to create specific logic circuits.

Thus invention being thus described in various embodiments, it will be obvious that the same may be varied in many ways. Such variations are not to be regarded as departure from the spirit and the scope of the invention, and all such modifications as would be obvious to one skilled in the art are intended to be included within the scope of the following claims.

What is claimed is:

1. A network element, coupled to a first uni-directional link having a first direction and a second uni-directional link having a second direction, the network element comprising:

a monitor module, coupled to the first link, adapted to detect a failure on the first link and further adapted to transmit a failure signal;

a controller, coupled to the monitor module, adapted to receive the failure signal and further adapted to transmit a first control signal; and a mesh protection service (MPS) module, coupled to said controller, adapted to receive the first control signal and further adapted to transmit on the second link an MPS message signal;

wherein said MPS message signal includes information regarding the failure of the first link; and wherein said first direction and said second direction are different directions from one another.

2. The network element of claim 1 further comprising:

a protection link module, coupled to said controller, adapted to receive a second control signal from the controller and further adapted to transmit a protection signal to the controller, wherein the protection signal includes information regarding the availability of a protection link for the first link.

3. The network element of claim 1 further comprising a signaling and routing module, coupled to said controller, adapted to receive a second controller signal from the controller and further adapted to transmit a release message signal.

4. The network element of claim 1 wherein the MPS message signal is a line-level signal.

5. The network element of claim 1 wherein said MPS message signal is included within an overhead byte.

6. The network element of claim 1 wherein said second link is an out-of-band link.

7. A communications network comprising:
a first network element;
a second network element;
a first uni-directional link, wherein said first link is coupled between the first network element and the second network element and said traffic can be transmitted in a first direction along the first link, wherein said first direction is from the first network element to the second network element;
a second uni-directional link, wherein said second link is coupled between the first network element and the second network element and said traffic can be transmitted in a second direction along the second working link, wherein said second direction is from the second network element to the first network element;
wherein said second network element includes:
a monitor module, coupled to the first working link, adapted to detect a failure on the first link and further adapted to transmit a failure signal;
a controller, coupled to the monitor module, adapted to receive the failure signal and further adapted to transmit a first control signal; and
a mesh protection service (MPS) module, coupled to said controller, adapted to receive the first control signal and further adapted to transmit on the second working link an MPS message signal;
wherein said MPS message signal includes information regarding the failure of the first link.

8. The communications network of claim 7 further comprising:
a third network element;
a third uni-directional link, wherein said third link is coupled between the first network element and the third network element and said traffic can be transmitted in a third direction along the third link, wherein said third direction is from the first network element to the third network element;
wherein in response to said MPS message signal, said first network element transmits a release message signal to said third network element.

9. The communications network of claim 7 wherein said second network element includes a protection link module, coupled to said controller, adapted to receive a second control signal from the controller and further adapted to transmit a protection signal to the controller, wherein the protection signal includes information regarding the availability of a protection link for the first link.

10. The communications network of claim 7 further comprising:
a third network element, coupled to said second network element;
wherein the second network element further comprises a signaling and routing module, coupled to said controller, adapted to receive a second controller signal from the controller and further adapted to transmit a release message signal.

11. The communications network of claim 7 wherein said MPS message signal is a line-level signal.

12. The communications network of claim 7 wherein said MPS message signal is provided in an overhead byte.

13. The communications network of claim 7 wherein said MPS message signal is transmitted on an out-of-band link.

14. A computer readable storage medium for use with a processor in a network element, the storage medium having machine-readable computer program code, the storage medium including instructions for causing the processor to implement a method comprising the steps of:
detecting on a first uni-directional network element a failure on a first link, wherein said first link is coupled between the first network element and a second network element; and
transmitting on a second uni-directional link, coupled between the first network element and the second network element, a mesh protection services message from the first network element to the second network element, wherein the mesh protection services message includes information regarding the failure of the first link.

15. The computer readable storage medium of claim 14 including further instructions for causing the processor to implement a further step of transmitting a release message signal from the first network element to a third network element.

16. The computer readable storage medium of claim 14 including further instructions for causing the processor to implement the further steps of:
determining whether a first protection link, coupled between the first network element and the second network element, is available for carrying traffic redirected from the first link; and
if the first protection link is determined to be available, redirecting traffic from the first link to the first protection link.

17. A method for mesh protection services in a communications network comprising a plurality of network elements, the method comprising the steps of:
detecting on a first network element a failure on a first uni-directional link, wherein said first link is coupled between the first network element and a second network element and said first working line has a first direction; and
transmitting on a second uni-directional link, coupled between the first network element and the second network element and having a second direction, a mesh protection services message from the first network element to the second network element,
wherein the mesh protection services message includes information regarding the failure of the first link; and
wherein said first direction and said second direction are different directions from one another.

18. The method of claim 17 further comprising the step of transmitting a release message signal from the first network element to a third network element.

19. The method of claim 17 further comprising the steps of:
determining whether a first protection link, coupled between the first network element and the second network element, is available for carrying traffic redirected from the first link; and if the first protection link is determined to be available, redirecting traffic from the first link to the first protection link.

20. A method for mesh protection services in a communications network comprising a plurality of network elements, the method comprising the steps of:

receiving on a first network element from a first link, coupled between the first network element and a second network element and having a first direction, a mesh protection services (MPS) message signal; and transmitting from the first network element to a second link, coupled between the first network element and a third network element and having a second direction, a release message signal, wherein said first direction and said second direction are different directions from one another.

* * * * *